United States Patent [19]
Nakano

[11] Patent Number: 6,055,728
[45] Date of Patent: May 2, 2000

[54] AUTOMATICALLY ASSEMBLING METHOD TO CONNECT PLURAL MEMBERS

[75] Inventor: Tomoaki Nakano, Kariya, Japan

[73] Assignee: Denso Corporation, Kariya, Japan

[21] Appl. No.: 09/082,973

[22] Filed: May 21, 1998

[30] Foreign Application Priority Data

May 23, 1997 [JP] Japan .................................. 9-150217

[51] Int. Cl.⁷ ................................................ B23P 15/26
[52] U.S. Cl. .................................. 29/890.035; 29/890.03
[58] Field of Search ........................... 29/407.1, 890.035, 29/890.03, 407.09, 407.11

[56] References Cited

U.S. PATENT DOCUMENTS

| | | | |
|---|---|---|---|
| 4,706,353 | 11/1987 | Zgliczynski et al. | 29/407.1 |
| 4,800,638 | 1/1989 | Herringshaw et al. | 29/407.1 |
| 5,560,102 | 10/1996 | Micale et al. | 29/407.1 |

FOREIGN PATENT DOCUMENTS

| | | |
|---|---|---|
| 58-165981 | 10/1983 | Japan . |
| 4-176577 | 6/1992 | Japan . |

*Primary Examiner*—Irene Cuda
*Attorney, Agent, or Firm*—Harness, Dickey & Pierce, PLC

[57] ABSTRACT

An automatically assembling method to connect two members while providing an intermediate member therebetween, including first, second, and third steps. In the first step, a first member and a second member are connected together without interposing the intermediate member therebetween. In the second step, the first and second members are separated away from each other in a predetermined direction, and the first member is set in a predetermined position with respect to the intermediate member while keeping a positioning relationship with the second member. In the third step, the first and second members are approached and connected to each other while providing the intermediate member therebetween.

4 Claims, 4 Drawing Sheets

AUTOMATICALLY ASSEMBLING METHOD TO CONNECT PLURAL MEMBERS

CROSS REFERENCE TO RELATED APPLICATION

This application is based on and incorporates herein by reference Japanese Patent Application No. Hei 9-150217 filed on May 23, 1997.

BACKGROUND OF THE INVENTION

1. Field of the Invention

The present invention relates to an automatic assembling method to connect two members together interposing an intermediate member therebetween.

2. Description of Related Art

JP-A-58-165981 discloses an assembling method in which a first manipulator holds a first member at a predetermined position continuously, while a second manipulator supplies a second member to the predetermined position for connecting them together.

JP-A-4-176577 discloses an assembling method in which two members are assembled to a third member such as a vehicle chassis. In this assembling method for connecting plural members together, a pair of holders is provided to a member which is movable in an X-Y direction and a rotating direction. These two holders can move in a direction perpendicular to the axis of rotation of the member, and at least one of holders can approach and separate away from the other holder. Thus, the two members can be assembled to the third (intermediate) member while being set in required positions thereof respectively.

As described-above, there may be a case in which an intermediate member such as a vehicle chassis or a partition wall of a casing is arranged between the two members. For example, an air flow direction controlling door and a door angle controlling plate are connected together interposing the partition wall of the casing therebetween.

In this case, because the three members have to be controlled to be set in predetermined positions respectively, the assembling operation becomes difficult. According to the above-described conventional assembling methods, the holders and the manipulators have to be controlled with high accuracy, and programming operations therefor need to be changed to each of the different types of members.

The assembling method disclosed in JP-A-58-165981 requires two manipulators to hold and position these two members respectively. That is, two robots or a robot having two arms are needed, thereby requiring a wide space. The two manipulators are controlled to move not to interfere with each other, and the two holders are position-controlled to connect the two members together. Thus, the two manipulators have to be controlled with high accuracy in accordance with the movements of the holders. Further, programming operations for the manipulators and the holders have to be changed every time a different type of a member is dealt with.

In the assembling method disclosed in JP-A-4-176577, because two holders are formed on a single manipulator, the two members cannot be picked out simultaneously. The two members are picked out at two steps, thereby requiring a large operating period. Further, as in the JP-A-58-165981, because the holders control the position of the connecting portion between the two members, the movements of the holders have to be controlled with high accuracy in accordance with the movements of the holders. Therefore, programming operations for the manipulator and the holders have to be changed every time a different type of a member dealt with.

SUMMARY OF THE INVENTION

An object of the present invention is to provide an automatic assembling method to easily connect two members interposing an intermediate member therebetween without controlling a manipulator or a holder with high accuracy.

According to the present invention, in a first step, a first member and a second member are connected together without providing an intermediate member therebetween. This first step is easily completed because there is no intermediate member between the first and second members.

In a second step, the first and second members are separated away from each other in the predetermined direction. After that, the first member is set in a predetermined position with respect to the intermediate member while keeping a positioning relationship with the second member. This second step is also easily completed because the first and second members are simply separated in the predetermined direction.

In a third step, the first and second members are caused to approach and be connected to each other while the first member is positioned with respect to the intermediate member. This third step is also easily completed because the movements of the first and/or second members are simple reciprocating movements.

In this way, in the present invention, even after the first and second members are once separated away from each other in the predetermined direction, the positioning relationship between them is kept. Thus, an assembling apparatus has only to execute the simple reciprocating movement (s) of the first and/or second members by holders in the second and third steps. Whereby control settings for the holders can be simplified.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Figure 1:
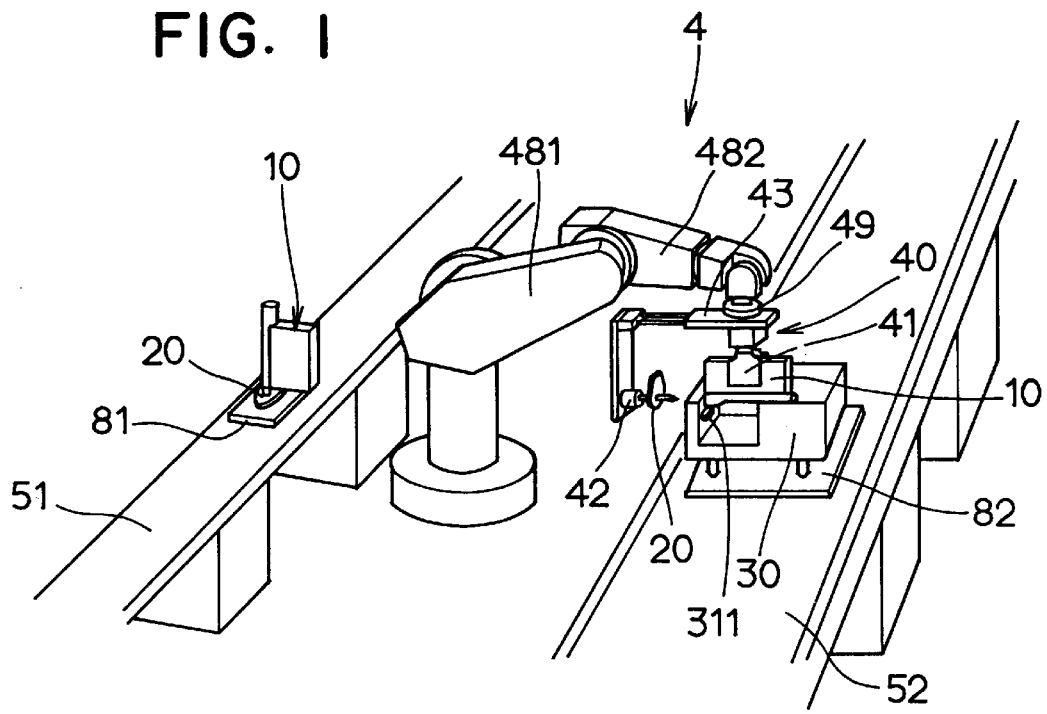
FIG. 1 is a perspective view showing an assembling apparatus and members being assembled according to a present embodiment.

Referring to the drawings, preferred embodiments of the present invention will be described.

Figure 3:
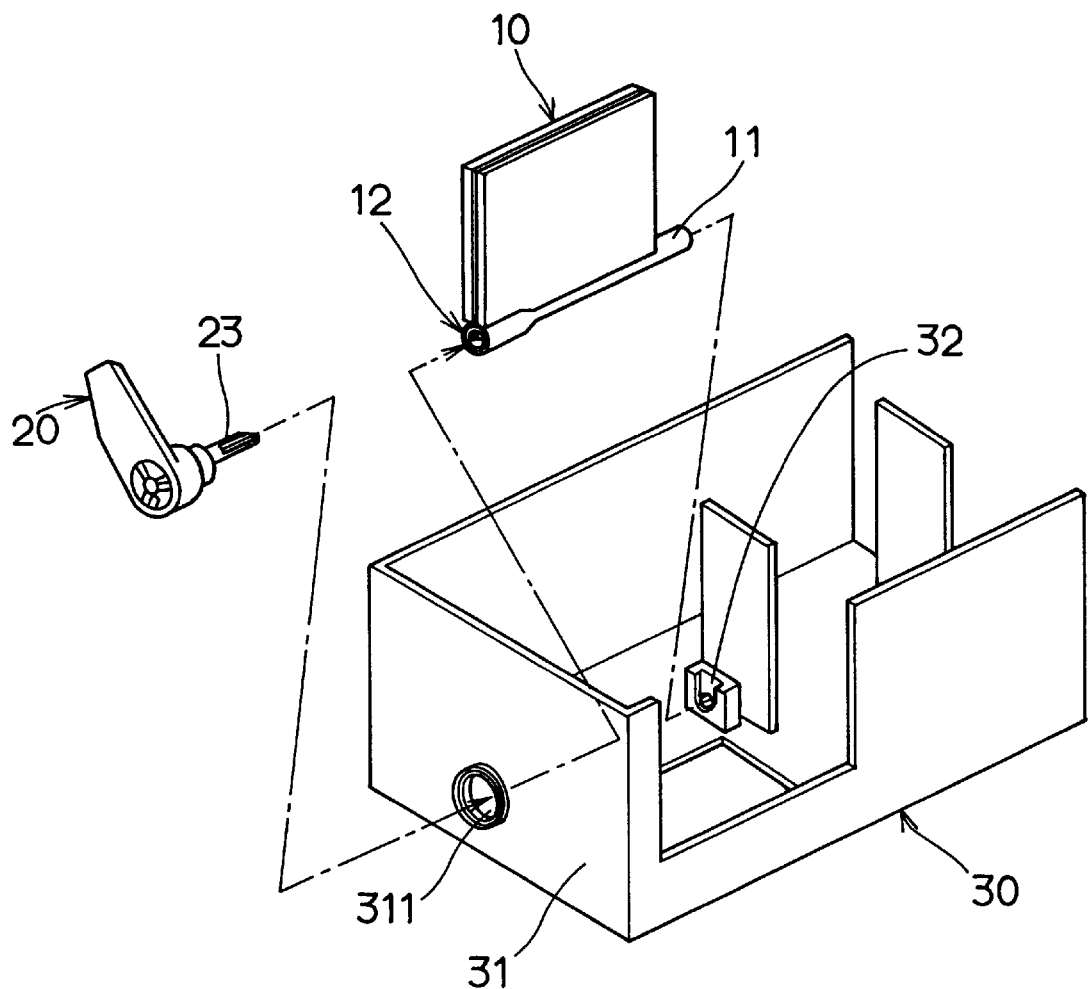
FIG. 3 is a perspective view showing an assembling process.

In a present embodiment, as shown in FIG. 3, a door 10 and a plate 20 are connected together automatically by inserting a connecting pin 23 of the plate 20 into a connecting hole 12 of the door 20. At this time, a casing 30 is interposed between the door 10 and the plate 20 as an intermediate member. Here, the door 10 controls an air-flow direction in a vehicle air conditioning apparatus, the plate 20 operates the movement of the door 10, and the casing 30 is an air conditioning unit casing of the air conditioning apparatus.

Figure 2:
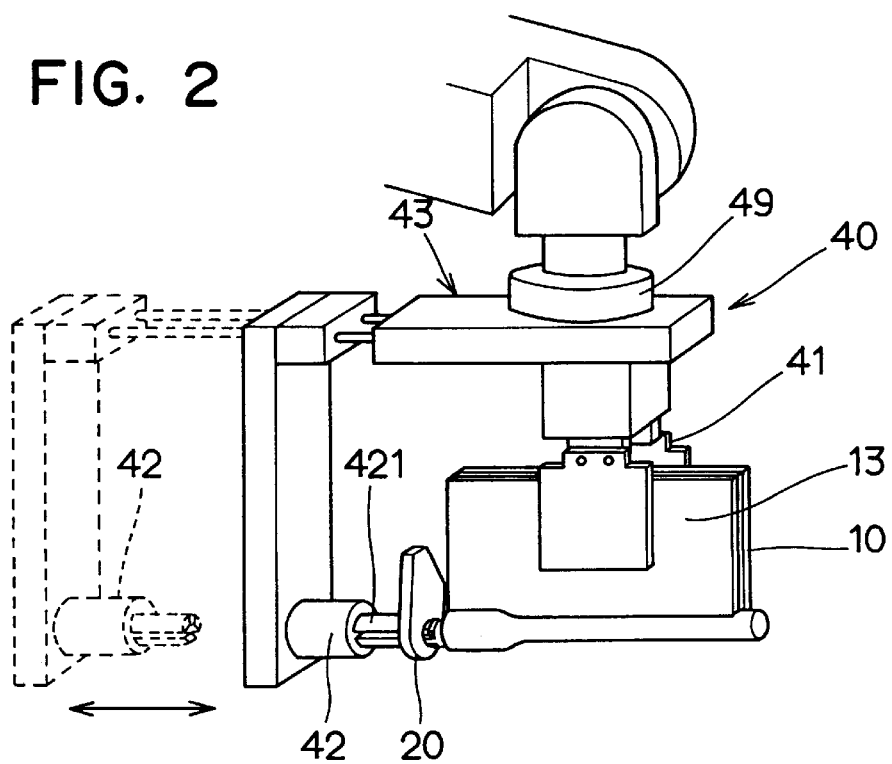
FIG. 2 is a perspective view showing operations of a first holder and a second holder.

A hand 40 of an assembling robot 4 has, as shown in FIGS. 1, 2, first and second holders 41, 42 to respectively grasp the door 10 and the plate 20, and an air-cylinder 43 to operate the holder 42 to approach or go away from the first holder 41.

An assembling process according to the present embodiment includes first, second, and third steps. In the first step, the door 10 and the plate 20 are provisionally connected together, without providing the casing 30 therebetween, by a members-assembling apparatus (not illustrated). In the second step, when the door 10 and the plate 20 provisionally connected together are conveyed by a first conveyor 51, the first and second holders 41, 42 grasp the door 10 and the plate 20 respectively. After that, the door 10 and the plate 20 are separated by the air-cylinder 43 as shown in FIG. 1, and are moved to respective predetermined positions with respect to the casing 30 put on a second conveyor 52 while being kept in a positioning relationship between the door 10 and the plate 20. In the third step, the second holder 42 is operated so that the plate 20 approaches the door 10, and the door 10 and the plate 20 are connected together again by inserting the connecting pin 23 into the connecting hole 12.

The door 10, the plate 20, and the casing 30 are made of resin. As shown in FIG. 3, one end of a shaft 11 of the door 10 is placed into a socket 32 provided at the central position in the casing 30. The connecting pin 23 of the plate 20 is inserted into the connecting hole 12 formed at the other end of the shaft 11 through an insertion hole 311. The insertion hole 311 is formed in a side wall 31 of the casing 30.

Figure 4:
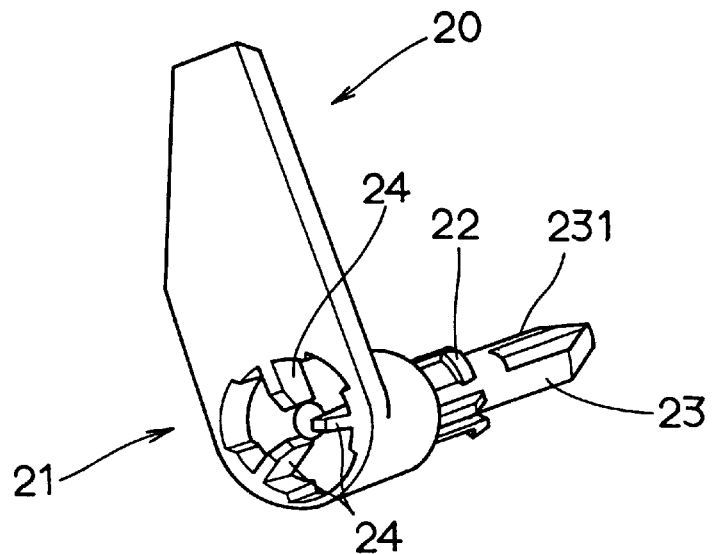
FIG. 4 is a perspective view showing a plate according to the present embodiment.
Figure 5:
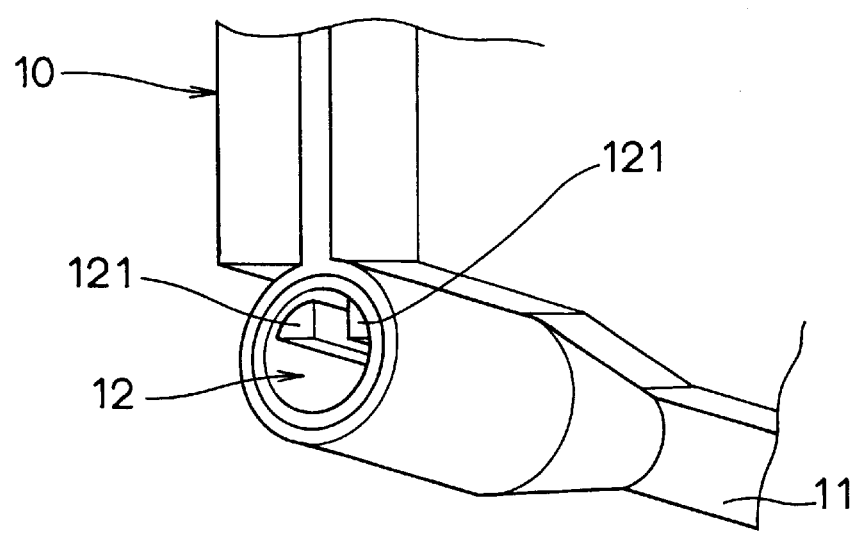
FIG. 5 is an enlarged perspective view showing a shape of a connecting hole of a door according to the present embodiment.

A pair of forks 121 are provided in the connecting hole 12 as shown in FIG. 5. The connecting pin 23 is protruded from the plate 20 and has a projection 231 as shown in FIG. 4. When the connecting pin 23 is inserted into the connecting hole 12, the projection 231 is fitted to the forks 121. Thereby, the connecting pin 23 is connected and fixed to the connecting hole 12. In this way, the door 10 and the plate 20 are connected together and the plate 20 can rotate around the center axis of the shaft 11 (connecting hole 12) integrally.

Figure 6A:
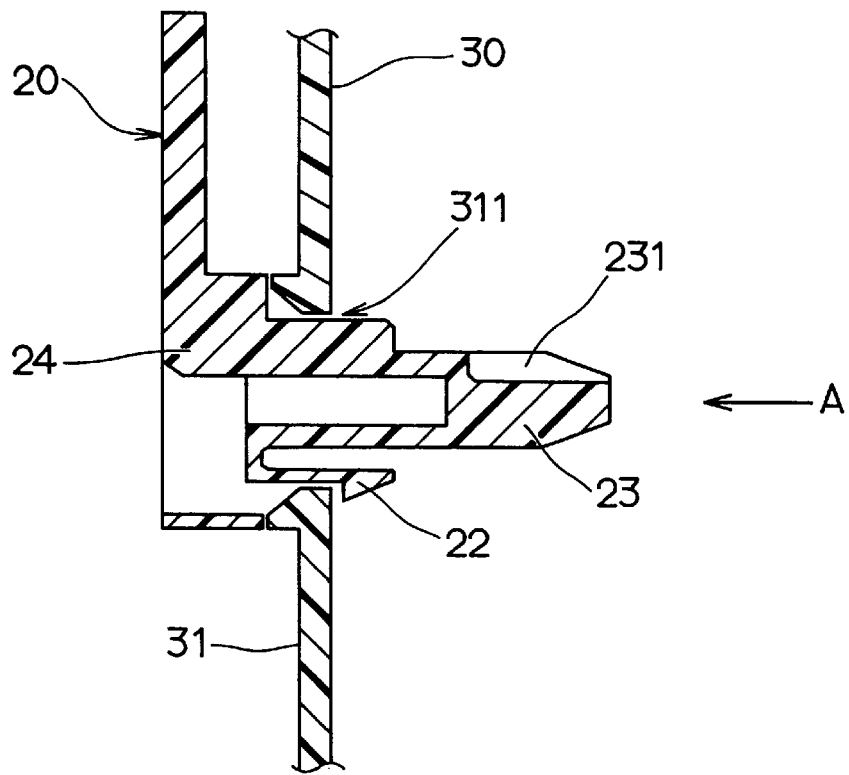
FIG. 6A is a cross sectional view showing a connecting portion between the plate and a casing according to the present embodiment.
Figure 6B:
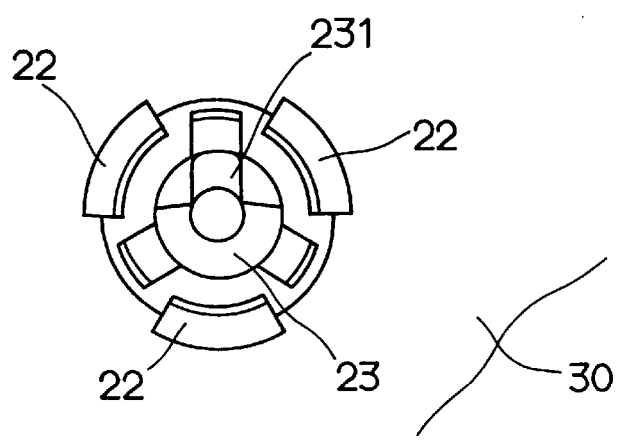
FIG. 6B is a front view of the plate and a casing as seen from a direction of an arrow A in FIG. 6A.

As shown in FIGS. 4, 6, three stoppers 22 are provided around the connecting pin 23 to be symmetrical with respect to the center axis of the connecting pin 23. When the connecting pin 23 is inserted into the insertion hole 311 of the casing 30, the stoppers 22 are distorted. However, after insertion, the stoppers 22 are restored by the resilience thereof. As a result, the stoppers 22 are attached to the wall surface around the insertion hole 311 by hooks formed at the ends thereof, as shown in FIG. 6A. In this way, the plate 20 is fixed to the casing 30 and cannot come out of it.

Further, as shown in FIG. 4, a grasped hole 21 into which the jaws of the second holder 42 are inserted is formed at a bent portion of the plate 20. At the inside surface of the grasped hole 21, three ribs 24 are provided to be away from each other by being symmetrical with respect to the center of the grasped holes 21.

The hand 40 is provided at an end of a flange 49 of the assembling robot 4, as shown in FIG. 1. The hand 40 includes the first holder 41, the second holder 42, and the air-cylinder 43. The first holder 41 is provided to be perpendicular to the flat surface of the flange 49 as shown in FIG. 2. The second holder 42 is provided in such a manner that the jaws 421 thereof extend parallel to the holding face of the first holder 41. The air-cylinder 43 operates the second holder 42 approach or go away from the first holder 41 in parallel to the flat surface of the flange 49.

Arms 481, 482 of the assembling robot 4 move between the first conveyor 51 and the second conveyor 52, and operate the flange 49 to move upwardly and downwardly.

Hereinafter, the three steps will be described in more detail.

In the first step, the plate 20 is firstly set in a pallet 81 by a conventional members-assembling apparatus (not illustrated). Next, by the same members-assembling apparatus, the door 10 is set on to the plate 20 having been set on the pallet 81. At this time, as the plate 20 is positioned fixedly in the pallet 81, the operation to set the door 10 on to the plate 20 is the same operation as to set the door 10 on to an independent pallet. Therefore, the above-described process can be attained by using the conventional members-assembling apparatus for connecting two members together directly. It is to be noted that the plate 20 is set in the pallet 81 by inserting a projection of the pallet 81 into the grasped hole 21 provided with the ribs 24. The door 10 and the plate 20 provisionally connected together are fed by the first conveyor 51.

In the second step, the first holder 41 grasps the door 10. Therefore, the air-cylinder 43 operates the second holder 42 to approach the first holder 41, as shown in FIG. 2. The projection 421 of the second holder 42 is inserted into the grasped hole 21 of the plate 20.

The arms 481, 482 are controlled in such a manner that, when the air-cylinder 43 operates the second holder 42 grasping the plate 20 to go away from the first holder 41 grasping the door 10 by the maximum distance and the door 10 is moved to the predetermined position in the casing 30, the hand 40 and the plate 20 avoid interfering with the casing 30.

When the door 10 and the plate 20 connected together are fed by the first conveyor 51, the robot 4 is waiting while directing the first holder 41 in a direction perpendicular to the feeding direction of the first conveyor 51, for grasping a grasped portion 13 of the door 10 set in the pallet 81.

When the pallet 81 is fed in front of the robot 4, the air-cylinder 43 operates the second holder 42 to go away from the first holder 41 by the maximum distance, and the first holder 41 grasps the door 10. Here, a space is provided under the first conveyor 51 where the pallet 81 is positioned for the second holder 42 avoiding a collision with the first conveyor 51.

Next, the door 10 is taken out of the pallet 81 by the first holder 41, and moved from the side of the first conveyor 51 to the side of on the second conveyor 52. At this time, because the door 10 and the plate 20 are provisionally connected together, the plate 20 is also moved from the side of the first conveyor 51 to the side of the second conveyor 52. Simultaneously, the air-cylinder 43 operates the second holder 42 so that the jaws 421 move into the grasped hole 21 while escaping from the ribs 24 in the grasped hole 21, and expand therein to grasp the plate 20.

After that, when the air-cylinder 43 operates the second holder 42 to go away from the first holder 41, the door 10 and the plate 20 are separated away from each other while keeping a positioning relationship therebetween except for a positioning relationship with respect to the axial direction of the shaft 11.

Next, the casing 30 having been set in a pallet 82 is fed to an assembling position by the second conveyor 52.

The robot 4 operates the door 10 to move it to the assembling position in the casing 30, and positions the shaft 11 of the door 10 in the socket 32 of the casing 30 while keeping the door 10 from interfering with the casing 30. Simultaneously, the robot 4 sets the connecting hole 12 at the center of the insertion hole 311 of the casing 30. At this time, the insertion hole 311 and the connecting hole 12 are positioned in the moving direction of the connecting pin 23 operated by the air-cylinder 43.

In the third step, the air-cylinder 43 operates the second holder 42 to approach to the first holder 41 again. Thereby, the connecting pin 23 is inserted into the connecting hole 12, and the stoppers 22 of the plate 20 are attached to the surface around the insertion hole 311. In this way, the door 10 and the plate 20 are assembled to the casing 30.

After the door 10 and the plate 20 are assembled to the casing 30, the first holder 41 and the second holder 42 take off the door 10 and the plate 20 respectively. The air-cylinder 43 operates the second holder 42 to go away from the first holder 41, while the hand 40 moves upwardly from the casing 30 and to an initial position thereof. In this way, the assembling operation is completed.

Accordingly, the plural members can be assembled by only one robot in a small space.

In the above-described assembling operation, it is not required to set positions of the door 10 and the plate 20 respectively, which is required in a conventional assembling operation to assemble three members. That is, a simple reciprocating movement of the second holder 42 with respect to the first holder 41 is only required, thereby attaining a rapid assembling operation.

In the conventional assembling operation, the robot 4 has to be programmed to operate two members, i.e., the door 10 and the plate 20, respectively, thus the programming operation is complicated. However, in the present embodiment, when the door 10 and the plate 20 are once separated away from each other, the positioning relationship between them is kept. Thus, the robot 4 has only to be programmed for only one member, thereby simplifying the programming operation.

Further, the door 10 and the plate 20 are connected before the robot 4 starts to assemble them to the casing 30. The door 10 and the plate 20 thus connected are picked out of the pallet 81 simultaneously, thereby attaining a rapid assembling operation.

As above-described, according to the present embodiment, the door 10 and the plate 20 are automatically assembled while providing the casing 30 therebetween without operating the robot 4 complicatedly.

What is claimed is:

1. An automatic assembling method to connect a first member and a second member together while providing an intermediate member therebetween, comprising:

a first step in which said first member and said second member are connected together without providing said intermediate member;

a second step in which said first and second members are separated from each other in a predetermined direction, and said first member is set in a predetermined position with respect to said second member;

a third step in which said intermediate member is provided between said first member and said second member; and a fourth step in which said first member and said second member are connected to each other again.

2. An automatic assembling method according to claim 1, wherein, in said second step, a first holder grasps said first member, a second holder grasps said second member, and an air-cylinder operates at least one of said first and second holders to separate said first and second members from each other.

3. An automatic assembling method according to claim 1, wherein in said fourth step, said second member is approached and connected to said first member by an air-cylinder.

4. An automatic assembling method according to claim 1, wherein said first member is an air-flow direction controlling door in an air-conditioning apparatus, said second member is a plate controlling an angle of said air-flow direction controlling door, and said intermediate member is a casing in the air-conditioning apparatus.

* * * * *